US012619727B2

(12) United States Patent (10) Patent No.: US 12,619,727 B2
Mishra et al. (45) Date of Patent: May 5, 2026

(54) HARDWARE TROJAN DETECTION USING SHAPLEY ENSEMBLE BOOSTING

(71) Applicant: University of Florida Research Foundation, Incorporated, Gainesville, FL (US)

(72) Inventors: Prabhat Kumar Mishra, Gainesville, FL (US); Zhixin Pan, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 82 days.

(21) Appl. No.: 18/437,674

(22) Filed: Feb. 9, 2024

(65) Prior Publication Data

US 2024/0273204 A1 Aug. 15, 2024

Related U.S. Application Data

(60) Provisional application No. 63/484,240, filed on Feb. 10, 2023.

(51) Int. Cl.
*G06F 21/56* (2013.01)
*G06F 21/71* (2013.01)
(Continued)

(52) U.S. Cl.
CPC ............ G06F 21/566 (2013.01); G06F 21/71 (2013.01); G06N 20/20 (2019.01); *G06F 21/72* (2013.01);
(Continued)

(58) Field of Classification Search
CPC ........ G06F 21/566; G06F 21/71; G06F 21/72; G06F 21/76; G06F 2221/034; G06N 20/20
See application file for complete search history.

(56) References Cited

U.S. PATENT DOCUMENTS

| 2016/0055412 A1* | 2/2016 | Carroll | ................... G16H 50/20 706/46 |
| 2020/0372152 A1* | 11/2020 | Schat | .................... G06F 21/556 |
| 2024/0119121 A1* | 4/2024 | Lin | ........................ G06N 20/00 |

FOREIGN PATENT DOCUMENTS

| CN | 109684834 A | * | 4/2019 | .......... G06F 21/561 |
| CN | 109815705 A | * | 5/2019 | |

OTHER PUBLICATIONS

Hasegawa, K., Shi, Y., & Togawa, N. (Aug. 2018). Hardware trojan detection utilizing machine learning approaches. In 2018 17th IEEE International Conference (TrustCom/BigDataSE) (pp. 1891-1896). IEEE. (Year: 2018).*

(Continued)

*Primary Examiner* — Robert B Leung

(74) *Attorney, Agent, or Firm* — Alston & Bird LLP

(57) ABSTRACT

Various embodiments of the present disclosure provide hardware trojan detection using Shapley ensemble boosting. In one example, an embodiment provides for extracting a plurality of features related to hardware trojan detection from one or more circuit samples related to one or more circuits, training one or more machine learning models based at least in part on the plurality of features, modifying the one or more machine learning models based at least in part on a set of Shapley values to generate one or more enhanced machine learning models for hardware trojan detection related to the one or more circuits, and deploying the one or more enhanced machine learning models for the hardware trojan detection related to the one or more circuits.

20 Claims, 7 Drawing Sheets

(51) Int. Cl.
    *G06F 21/72*     (2013.01)
    *G06F 21/76*     (2013.01)
    *G06N 20/20*     (2019.01)

(52) U.S. Cl.
    CPC ........ *G06F 21/76* (2013.01); *G06F 2221/034*
                            (2013.01)

(56) References Cited

OTHER PUBLICATIONS

Kumar, R., & Subbiah, G. (2022). Zero-day malware detection and effective malware analysis using Shapley ensemble boosting and bagging approach. Sensors, 22(7), 2798. (Year: 2022).*

Liakos, K. G., Georgakilas, G. K., Moustakidis, S., Karlsson, P., & Plessas, F. C. (Nov. 2019. Machine learning for hardware trojan detection: A review. In 2019 Panhellenic Conference on Electronics & Telecommunications (PACET) (pp. 1-6). IEEE. (Year: 2019).*

Rozemberczki, B., Watson, L., Bayer, P., Yang, H. T., Kiss, O., Nilsson, S., & Sarkar, R. (Jul. 2022). The shapley value in machine learning. In the 31st International Joint Conference on Artificial Intelligence and the 25th European Conference on Artificial Intelligence (pp. 5572-5579). (Year: 2022).*

Banga, et al., "A Region Based Approach for the Identification of Hardware Trojans", *IEEE Xplore*, (8 pages), Jun. 9, 2008, DOI: 10.1109/HST.2008.4559047.

Banga, et al., "Trusted RTL: Trojan Detection Methodology in Pre-Silicon Designs", *IEEE*, (4 pages), Jun. 13, 2010, DOI: 10.1109/HST.2010.5513114.

Chakraborty, et al., "MERO: A Statistical Approach for Hardware Trojan Detection", *Cryptographic Hardware and Embedded Systems*, pp. 396-410, (2009).

Cruz, et al., "An Automated Configurable Trojan Insertion Framework for Dynamic Trust Benchmarks", *IEEE*, (6 pages), Mar. 19, 2018, DOI: 10.23919/Date.2018.8342270.

Cruz, et al., "Hardware Trojan Detection using ATPG and Model Checking", *IEEE*, (6 pages), Jan. 6, 2018, DOI: 10.1109/VLSID.2018.43.

Elnaggar, et al. "Hardware Trojan Detection Using Changepoint-Based Anomaly Detection Techniques", *IEEE Transactions on Very Large-Scale Integration Systems*, vol. 27, No. 23, (14 pages), Dec. 2019.

Haider, et al., "Advancing the State-of-the-Art in Hardware Trojans Detection, *IEEE Transactions on Dependable and Secure Computing*", vol. 16, No. 1, (15 pages), Jan. 2019.

Hasegawa, et al., "Trojan-feature Extraction at Gate-level Netlists and Its Application to Hardware-Trojan Detection Using Random Forest Classifier", *IEEE*, (4 pages), May 28, 2017, DOI:10.1109/ISCAS.2017.8050827.

Huang, et al., "MERS: Statistical Test Generation for Side-Channel Analysis based Trojan Detection", *Proceedings of the 2016 ACM SIGSAC Conference on Computer and Communications Security*, pp. 130-141, Oct. 24, 2016, doi.org/10.1145/2976749.2978396.

Huang, et al., "Scalable Test Generation for Trojan Detection Using Side Channel Analysis", *IEEE Transactions on Information Forensics and Security*, vol. 13, No. 11, Nov. 2018, (15 pages).

Lyu, et al., "MaxSense: Side-channel Sensitivity Maximization for Trojan Detection Using Statistical Test Patterns", *ACM Transactions in Design Automation of Electronic Systems*, vol. 26, No. 3, pp. 1-21, Jan. 6, 2021, doi.org/10.1145/3436820.

Lyu, et al., "Scalable Activation of Rare Triggers in Hardware Trojans by Repeated Maximal Clique Sampling", *IEEE Transactions on Computer-Aided Design of Integrated Circuits and Systems*, vol. 40, No. 7, (14 pages), Jul. 2021.

Narasimhan, et al., "TeSR: A Robust Temporal Self-Referencing Approach for Hardware Trojan Detection", *IEEE International Symposium on Hardware-Oriented Security and Trust*, (4 pages), Jun. 5, 2011, DOI: 10.1109/HST.2011.5954999.

Narasimhan, et al., "Hardware Trojan Detection by Multiple-Parameter Side-Channel Analysis", *IEEE Transactions on Computers*, vol. 62, No. 11, pp. 2183-2195, Aug. 20, 2012, DOI: 10.1109/TC.2012.200.

Nigh, et al., "AdaTrust: Combinational Hardware Trojan Detection Through Adaptive Test Pattern Construction", *IEEE Transactions on Very Large-Scale Integration Systems*, vol. 29, No. 3, pp. 544-557, Mar. 2021, DOI: 10.1109/TVLSI.2021.3053553.

Nozawa, et al. "Generating Adversarial Examples for Hardware-Trojan Detection at Gate-Level Netlists", *Journal of Information Processing*, vol. 29, pp. 236-246, Mar. 2021, DOI: 10.2197/ipsjjip.29.236.

Pan, et al., "Test Generation using Reinforcement Learning for Delay-based Side-Channel Analysis", *Proceedings of the 39th International Conference on Computer-Aided Design*, Article No. 109, pp. 1-7, Dec. 17, 2020, doi.org/10.1145/3400302.3415710.

Pan, et al., "Automated Test Generation for Hardware Trojan Detection using Reinforcement Learning", *Proceedings of the 26th Asia and South Pacific Design Automation Conference*, pp. 408-413, Jan. 29, 2021, doi.org/10.1145/3394885.3431595.

Salmani, et al., "On Design Vulnerability Analysis and Trust Benchmarks Development", *IEEE 31st International Conference on Computer Design*, (4 pages), Oct. 6, 2013, DOI:10.1109/ICCD.2013.6657085.

Salmani, et al., "COTD: Reference-Free Hardware Trojan Detection and Recovery Based on Controllability and Observability in Gate-Level Netlist", *IEEE Transactions on Information Forensics and Security*, vol. 12, No. 2, (13 pages), Feb. 2017.

Sharma, et al., A New Hardware Trojan Detection Technique using Deep Convolutional Neural Network, *Integration*, (11 pages), Mar. 13, 2021, doi.org/10.1016/j.vlsi.2021.03.001.

Shi, et al., "Test Generation for Hardware Trojan Detection Using Correlation Analysis and Genetic Algorithm", *ACM Transactions on Embedded Computing Systems*, vol. 20, No. 4, Article 28, pp. 1-20, Mar. 26, 2021, doi.org/10.1145/3446837.

Wolff, et al., "Towards Trojan-Free Trusted ICs: Problem Analysis and Detection Scheme", *Proceedings of the Conference on Design, Automation, and Test in Europe*, pp. 1362-1365, Mar. 10, 2008, doi.org/10.1145/1403375.1403703.

Zhang, et al., "VeriTrust: Verification for Hardware Trust", *IEEE Transactions on Computer-Aided Design of Integrated Circuits and Systems*, vol. 34, No. 7, (14 pages), Jul. 2015.

* cited by examiner

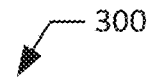

300

---

Algorithm 1: Detect with Shapley Ensemble Boosting

Input : Benchmark Dataset($\mathcal{D}$), Feature Set ($\mathcal{F}$),
              Instance ($s$), learning rate ($\alpha, \beta$), epochs ($k$)
   Output : Ensemble Model $\mathcal{T}$, Prediction *res*

1  Initialize:

2  $\mathcal{T} = \emptyset, N = \text{sizeof}(\mathcal{D}), M = \text{sizeof}(\mathcal{F}), t = 0$ 3  For each $X_i \in \mathcal{D}$, $w^b_{i_{(t)}} = \frac{1}{N}$ 4  For each $F_i \in \mathcal{F}$, $w^f_{i_{(t)}} = \frac{1}{M}$ 5  repeat

6     Random Sample $\mathcal{D}' \subset \mathcal{D}, \mathcal{F}' \subset \mathcal{F}'$ ▸ Data Sampling <u>102</u>

7     $T_{(t)} = \text{CART}(\mathcal{D}', \mathcal{F}')$      ▸ Model Training <u>104</u>

8     for *each* $X_i \in \mathcal{D}'$ do

9         $\hat{y}_i = T(X_i)$

10        $\mathcal{L}(y_i, \hat{y}_i) = (y_i \log \hat{y}_i + (1 - y_i)\log(1 - \hat{y}_i))$ 11       $w^b_{i_{(t+1)}} = w^b_{i_{(t)}} + \alpha \mathcal{L}(y_i, \hat{y}_i)$ ▸ Weight Adjustment <u>108</u>

12       for *each* $F_j \in mathcalF'$ do

13         Compute Shapley Values $SHAP(F_{ij})$

14         $w^f_{j_{(t+1)}} =$ $w^f_{j_{(t)}} + \beta \sum(\pm w^b_{i_{(t+1)}} \mathcal{L}(y_i, \hat{y}_i) SHAP(F_{ij}))$ ▹ Shapely Analysis <u>108</u>

15     $\mathcal{T} = \mathcal{T} \cup (T_{(t)})$

16     $t = t + 1$

17  until $t \geq k$ *or reaching convergence*;

18  $res = \mathcal{T}(s)$         ▸ Ensemble Prediction <u>110</u>

19  Return $\mathcal{T}, res$

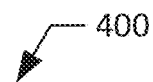
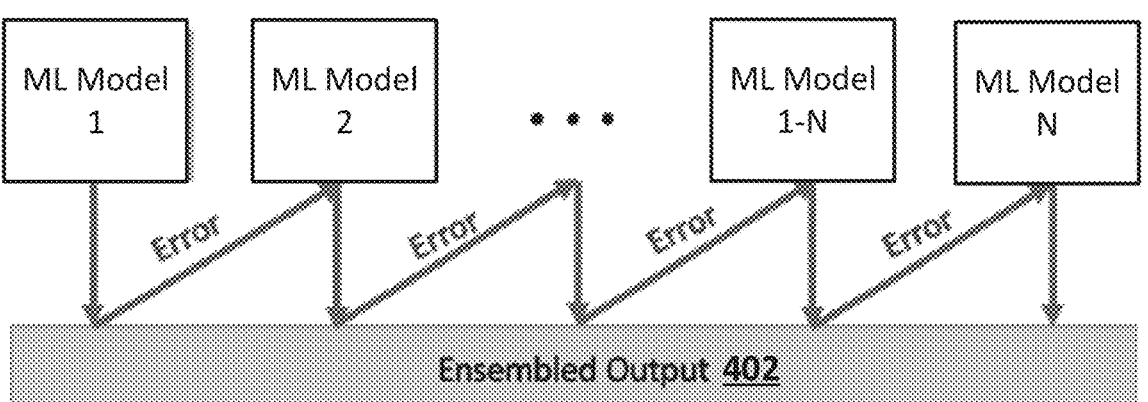
FIG. 4

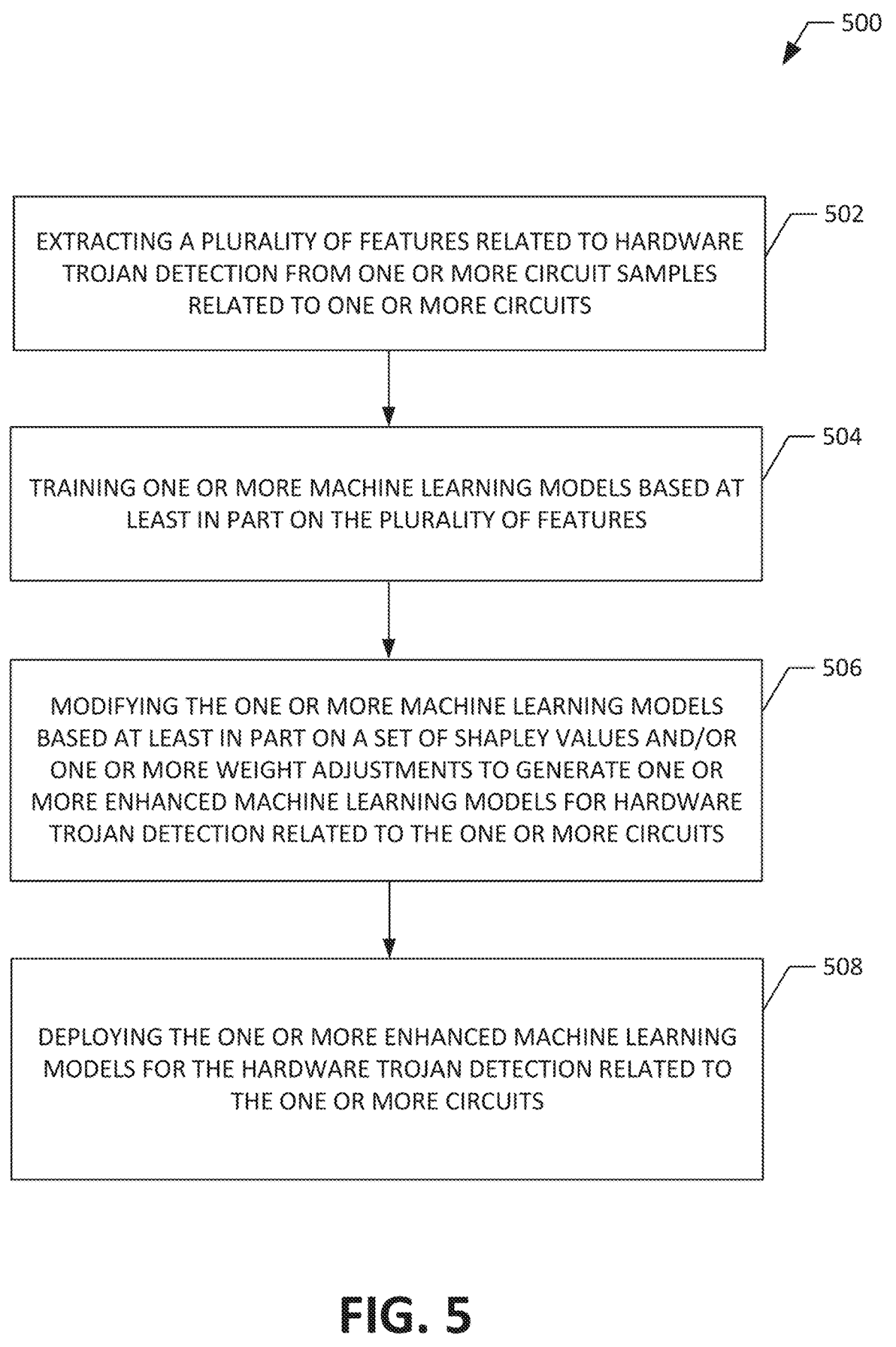

—— 500

EXTRACTING A PLURALITY OF FEATURES RELATED TO HARDWARE TROJAN DETECTION FROM ONE OR MORE CIRCUIT SAMPLES RELATED TO ONE OR MORE CIRCUITS —— 502

TRAINING ONE OR MORE MACHINE LEARNING MODELS BASED AT LEAST IN PART ON THE PLURALITY OF FEATURES —— 504

MODIFYING THE ONE OR MORE MACHINE LEARNING MODELS BASED AT LEAST IN PART ON A SET OF SHAPLEY VALUES AND/OR ONE OR MORE WEIGHT ADJUSTMENTS TO GENERATE ONE OR MORE ENHANCED MACHINE LEARNING MODELS FOR HARDWARE TROJAN DETECTION RELATED TO THE ONE OR MORE CIRCUITS —— 506

DEPLOYING THE ONE OR MORE ENHANCED MACHINE LEARNING MODELS FOR THE HARDWARE TROJAN DETECTION RELATED TO THE ONE OR MORE CIRCUITS —— 508

FIG. 5

HARDWARE TROJAN DETECTION USING SHAPLEY ENSEMBLE BOOSTING

CROSS REFERENCE TO RELATED APPLICATIONS

This application claims priority to U.S. Appl. No. 63/484,240 filed Feb. 10, 2023, the contents of which are incorporated herein in its entirety by reference.

GOVERNMENT SUPPORT

This invention was made with government support under 1908131 awarded by the National Science Foundation. The government has certain rights in the invention.

TECHNICAL FIELD

The present application relates to the technical field of cybersecurity for integrated circuits. In particular, the invention relates to detection, or evasion thereof, of cybersecurity attacks on semiconductor manufacturing, fabrication, testing, and/or the like with respect to integrated circuits.

BACKGROUND

Hardware cores are commonly employed in the semiconductor industry. Furthermore, a single System on Chip (SoC) generally comprises one or more third-party semiconductor cores such as one or more hardware Intellectual Property (IP) cores. However, hardware IP cores are generally vulnerable to security concerns such as hardware trojans. A hardware trojan is a malicious modification of a target integrated circuit (IC). Additionally, a hardware trojan is typically associated with a trigger and a payload. The trigger is typically created using a combination of rare events (e.g., rare signals or rare transitions) to stay hidden during normal execution of the IC. The payload typically represents a malicious impact on the IC design, commonly resulting in information leakage or erroneous execution of the IC. Accordingly, when the trigger is activated, the payload can enable the malicious activity. As such, an IP protection technique such as, for example, a machine learning (ML) based detection, can be employed to provide IP protection. However, ML based detection of hardware-based cybersecurity attacks typically result in various technical challenges and/or limitations.

SUMMARY

In general, embodiments of the present invention provide methods, apparatus, systems, computing devices, computing entities, and/or the like for providing hardware trojan detection using Shapley ensemble boosting. The details of some embodiments of the subject matter described in this specification are set forth in the accompanying drawings and the description below. Other features, aspects, and advantages of the subject matter will become apparent from the description, the drawings, and the claims.

In an embodiment, a method for providing Shapley ensemble boosting for hardware trojan detection related to circuits is provided. The method provides for extracting a plurality of features related to hardware trojan detection from one or more circuit samples related to one or more circuits, training one or more machine learning models based at least in part on the plurality of features, modifying the one or more machine learning models based at least in part on a set of Shapley values and/or one or more weight adjustments to generate one or more enhanced machine learning models for hardware trojan detection related to the one or more circuits, and deploying the one or more enhanced machine learning models for the hardware trojan detection related to the one or more circuits.

In another embodiment, an apparatus is provided. The apparatus comprises at least one processor and at least one memory including program code. The at least one memory and the program code is configured to, with the at least one processor, cause the apparatus to extract a plurality of features related to hardware trojan detection from one or more circuit samples related to one or more circuits, train one or more machine learning models based at least in part on the plurality of features, modify the one or more machine learning models based at least in part on a set of Shapley values and/or one or more weight adjustments to generate one or more enhanced machine learning models for hardware trojan detection related to the one or more circuits, and deploy the one or more enhanced machine learning models for the hardware trojan detection related to the one or more circuits.

In yet another embodiment, a non-transitory computer storage medium comprising instructions is provided. The instructions are configured to cause one or more processors to at least perform operations configured to extract a plurality of features related to hardware trojan detection from one or more circuit samples related to one or more circuits, train one or more machine learning models based at least in part on the plurality of features, modify the one or more machine learning models based at least in part on a set of Shapley values and/or one or more weight adjustments to generate one or more enhanced machine learning models for hardware trojan detection related to the one or more circuits, and deploy the one or more enhanced machine learning models for the hardware trojan detection related to the one or more circuits.

BRIEF DESCRIPTION OF THE DRAWINGS

Reference will now be made to the accompanying drawings, which are not necessarily drawn to scale, and wherein:

FIG. 3 illustrates an example algorithm that provides for Shapley ensemble boosting for hardware trojan detection, according to one or more embodiments of the present disclosure;

FIG. 4 illustrates an example ensemble boosting system for improving accuracy and efficiency of machine learning models, according to one or more embodiments of the present disclosure;

FIG. 5 illustrates a flowchart of a method for providing Shapley ensemble boosting for hardware trojan detection related to circuits according to one or more embodiments of the present disclosure.

DETAILED DESCRIPTION

Figure 1A:
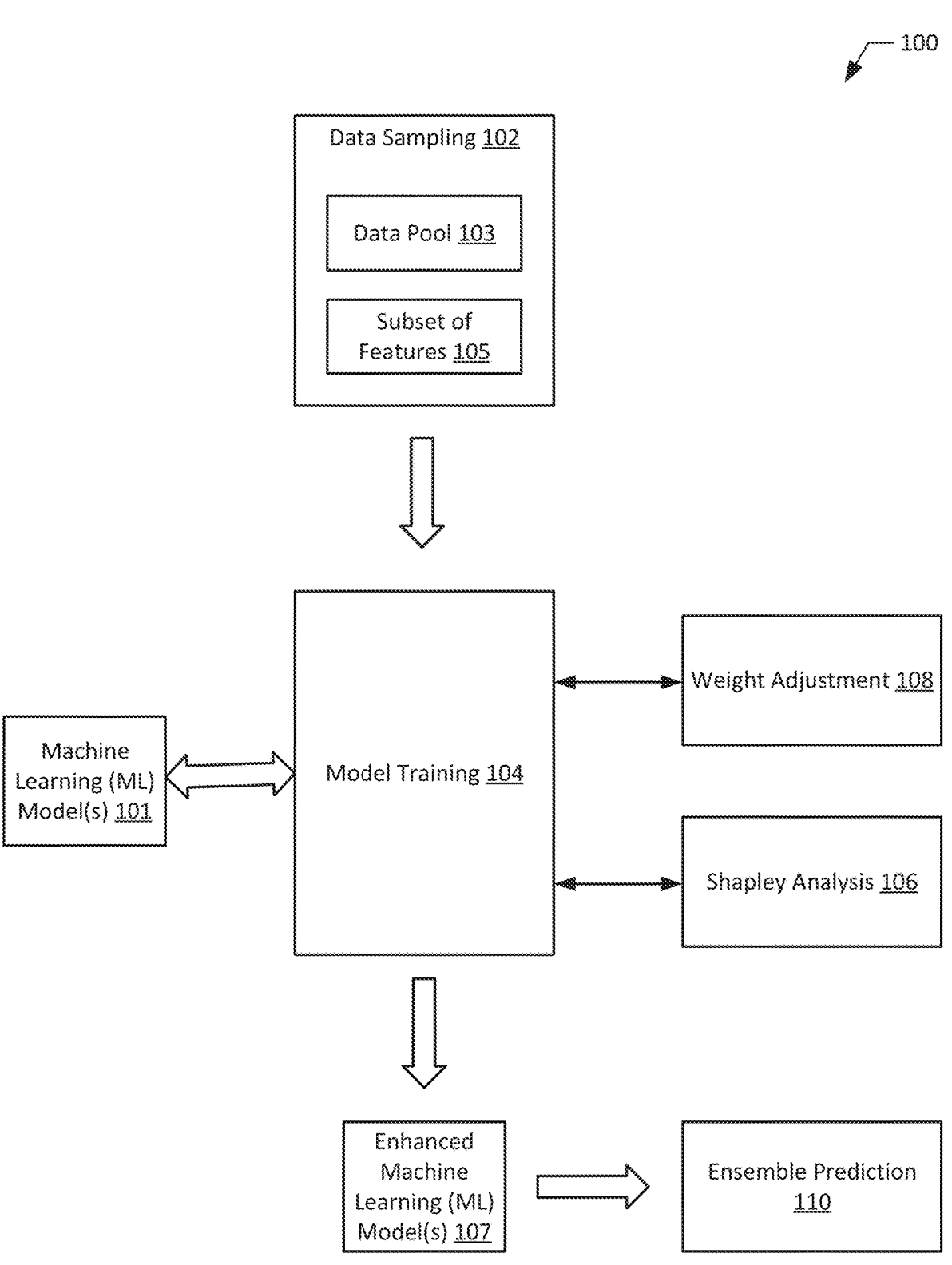
FIG. 1A provides an example Shapley ensemble boosting framework, according to one or more embodiments of the present disclosure.

The present disclosure more fully describes various embodiments with reference to the accompanying drawings.

It should be understood that some, but not all, embodiments are shown and described herein. Indeed, the embodiments may take many different forms, and, accordingly, this disclosure should not be construed as limited to the embodiments set forth herein. Rather, these embodiments are provided so that this disclosure will satisfy applicable legal requirements. Like numbers refer to like elements throughout.

As discussed above, hardware cores are commonly employed in the semiconductor industry. Furthermore, a single System on Chip (SoC) generally comprises one or more third-party semiconductor cores such as one or more hardware Intellectual Property (IP) cores. However, hardware IP cores are generally vulnerable to security concerns such as hardware trojans. A hardware trojan is a malicious modification of a target integrated circuit (IC). Additionally, a hardware trojan is typically associated with a trigger and a payload. The trigger is typically created using a combination of rare events (e.g., rare signals or rare transitions) to stay hidden during normal execution of the IC. The payload typically represents a malicious impact on the IC design, commonly resulting in information leakage or erroneous execution of the IC. Accordingly, when the trigger is activated, the payload can enable the malicious activity.

As such, an IP protection technique such as, for example, a machine learning (ML) based detection, can be employed to provide IP protection. However, ML based detection of hardware-based cybersecurity attacks typically result in various technical challenges and/or limitations. For example, ML based detection typically provide detection results that cannot be interpreted in a human understandable way. Furthermore, ML models related to ML based detection typically focus on extracting features from a given dataset, where the feature selection relies on expert knowledge without any established guidelines. Moreover, existing ML based detection techniques typically focus on generating complicated ML models to improve detection accuracy, which may introduce inefficient and/or excessive training costs for parameter tuning related to ML models. Finally, ML algorithms related to ML based detection are typically vulnerable towards adversarial attacks, and adversarial training as the commonly applied countermeasure typically suffers from expensive time costs related to computational processing.

Another type of IP protection technique that can be employed for IP protection is side-channel analysis. Side-channel analysis focuses on a difference in side-channel signatures (e.g., power, path delay, etc.) between expected values (e.g., a golden specification) and actual values (e.g., a trojan-inserted implementation). However, with side-channel analysis, it is typically difficult to detect negligible side-channel difference caused by certain hardware trojans (e.g., a tiny hardware trojan) since certain hardware trojans can be hidden from various IP protection techniques via process variation and/or environmental noise related to an IC.

To address these and/or other issues, various embodiments described herein relate to hardware trojan detection using Shapley Ensemble Boosting (SEB). For example, various embodiments described herein provide efficient hardware trojan detection based on SEB. In various embodiments, Shapley analysis (SHAP) and boosting can be combined to enable an explainable, fast and/or robust model for hardware trojan detection. For example, SEB can provide an explainable ML framework for hardware trojan detection. An explainable ML framework can employ explanation techniques associated with model transferring certain input into a prediction. Additionally, an explainable ML framework can identify a set of features that make key contributions to a forward pass of a ML model. In the explainable ML framework disclosed herein, a Shapley value analysis can be utilized to provide a contribution measurement related to a ML model. In various embodiments, the ML framework (e.g., the explainable ML framework) disclosed herein can exploit SHAP to generate a spectrum of impact of each feature towards model output of a ML model. The ML framework can additionally provide a decision process and/or can serve as a guideline for feature selection. The hardware trojan detection using SEB as disclosed herein can also provide a fast and robust boosting framework. In various embodiments, an ensemble model can be provided by combining a sequence of ML models to generate a classifier for hardware trojan detection. Accordingly, the hardware trojan detection using SEB as disclosed herein can improve detection accuracy (e.g., up to 24.6%) and/or time efficiency (e.g., up to 5.1×) for hardware trojan detection as compared to traditional hardware trojan detection techniques.

In various embodiments, Shapley value analysis can contribute to improved feature selection in order to improves accuracy of hardware trojan detection. In various embodiments, Shapley value analysis can provide improved machine learning behavior, improved result interpretation, and/or improved predictions for hardware trojan detection related to one or more circuits. In various embodiments, the ML framework can be an ensemble boosting framework. The ensemble boosting framework can utilize multiple optimized (e.g., lightweight) models to reduce complexity of machine learning models. Additionally or alternatively, the ensemble boosting framework can execute multiple optimized models in parallel to reduce an amount of time for hardware trojan detection. In various embodiments, a synergistic combination of ensemble boosting and Shapley value analysis can be provided, where Shapley value analysis identifies important features in a previous model to perform weight adjustment in a next model (e.g., among ensemble models) such that the next model mitigates one or more mispredictions of the previous model. In various embodiments, weight adjustment and/or selection of features for a model can be performed at least approximately simultaneously during an iteration of training for the model. Additionally or alternatively, weight adjustment and/or selection of features for a model can be performed at least approximately simultaneously with respect to weight adjustment and/or selection of features for one or more other models.

As disclosed herein, boosting can be a machine learning technique to improve accuracy of ML models such as, for example, predictive models or classifier models. In various embodiments, boosting can generate more robust ML models as compared to a traditional ML model by combining multiple ML models such as, for example, decision trees. The individual ML models can be trained sequentially, with each ML model compensating for errors of a previous ML model. A final ML prediction related to boosting can be provided by combining predictions of all the individual ML models. In various embodiments, boosting can be utilized for regression and/or classification tasks. Boosting can also minimize over-fitting outcomes while also providing high levels of accuracy without sacrificing generalization. Moreover, boosting can reduce an amount of time for providing a prediction since multiple ML models can be executed in parallel at run-time.

A. Exemplary Shapley Ensemble Boosting for Hardware Trojan Detection

According to various embodiments, Shapley ensemble boosting for hardware trojan detection is provided. FIG. 1A illustrates a Shapley ensemble boosting framework 100 for hardware trojan detection, according to one or more embodiments of the present disclosure. In various embodiments, the Shapley ensemble boosting framework 100 provides a synergistic integration of Shapley value analysis and/or boosting for efficient hardware trojan detection.

In one or more embodiments, the Shapley ensemble boosting framework 100 can be implemented via a Central Processing Unit (CPU), a Field Programmable Gate Arrays (FPGA), Graphics Processing Unit (GPU), a Tensor Processing Unit (TPU), an Application Specific Integrated Circuits (ASIC), and/or another type of processing device. For example, a GPU and/or a CPU implementation of the Shapley ensemble boosting framework 100 can be a software-based implementation for Shapley ensemble boosting related to hardware trojan detection. In another example, a FPGA, TPU and/or ASIC implementation of the Shapley ensemble boosting framework 100 can be a hardware-based implementation for Shapley ensemble boosting related to hardware trojan detection.

The Shapley ensemble boosting framework 100 includes data sampling 102, model training 104, Shapley analysis 106, and/or weight adjustment 108 to provide an ensemble prediction 110 for hardware trojan detection. The data sampling 102 can perform data sampling from one or more data sources. For example, the data sampling 102 can randomly sample data from a data pool 103 (e.g., a benchmark) associated with one or more data sources. The data pool 103 can be related to a benchmark (e.g., a circuit benchmark). For example, the data pool 103 can be related to a circuit sample (e.g., a fabricated circuit, a circuit design, etc.). The circuit sample can be related to an integrated circuit, a hardware IP core, an SoC that includes one or more hardware IP cores, or another type of circuit. Additionally, the data sampling 102 can extract a subset of features 105 from the sampled data associated with the data pool 103. The model training 104 can train one or more ML models 101 based on the sampled data and/or the subset of features 105 from the sampled data. The one or more ML models 101 can include one or more classifier models, one or more predictive models, one or more boosting models, and/or one or more other ML models configured for hardware trojan detection. In certain embodiments, the one or more ML models 101 can be one or more decision tree models.

In various embodiments, the model training 104 can retrain the one or more ML models 101 via one or more training stages (e.g., one or more additional iterations of training) to provide one or more enhanced machine learning models 107. Additionally, the one or more enhanced machine learning models 107 can be tested to record correct/incorrect predictions related to hardware trojan detection. For example, the one or more enhanced machine learning models 107 can be one or more enhanced machine learning models with respect to the one or more ML models 101. Additionally, the one or more enhanced machine learning models 107 can be configured for improved hardware trojan detection related to one or more circuits as compared to the one or more ML models 101.

In various embodiments, the Shapley analysis 106 can enhance the one or more ML models 101 using Shapley value analysis to provide the one or more enhanced machine learning models 107 configured for effective and/or robust machine learning for hardware trojan detection. In various embodiments, features derived by the Shapley analysis 106 can be utilized to build a boosting framework for hardware trojan detection. For example, features derived by the Shapley analysis 106 can be utilized for feature selection for one or more hardware trojan detection tasks. In one or more embodiments, the Shapley analysis 106 can determine an importance ranking of each feature from the subset of features 105. The weight adjustment 108 can adjust one or more weights for each sampled data and/or for each feature. In various embodiments, the data sampling 102, the model training 104, the Shapley analysis 106, and/or the weight adjustment 108 can be repeated for a certain number of iterations until reaching convergence for the ensemble prediction 110. In various embodiments, the Shapley analysis 106 and the weight adjustment 108 can be performed at least approximately simultaneously during an iteration. For example, one or more features can be selected and one or more weights can be adjusted for a ML model of the one or more ML models 101 at least approximately simultaneously during an iteration. Additionally or alternatively, one or more features can be selected and/or one or more weights can be adjusted for a ML model of the one or more ML models 101 at least approximately simultaneously with respect to selecting one or more features and/or adjusting one or more weights for one or more other ML models of the one or more ML models 101 during an iteration. The ensemble prediction 110 can utilize the trained framework associated with the data sampling 102, the model training 104, the Shapley analysis 106, and/or the weight adjustment 108 to provide an ensemble prediction associated with hardware trojan detection. For example, the one or more enhanced machine learning models 107 can be utilized to provide the ensemble prediction 110 associated with hardware trojan detection related to one or more circuits. In various embodiments, respective enhanced machine learning models 107 generated via the trained framework can produce respective ensemble predictions. Accordingly, overall voting associated with the ensemble prediction 110 can determine whether a data pool (e.g., a benchmark) is associated with a hardware trojan. In one or more embodiments, the Shapley ensemble boosting framework 100 can reduce a training time and/or an adversarial training time for the one or more ML models 101 in order to provide hardware trojan detection related to one or more circuits.

In various embodiments, the one or more trained ML models 107 can be a sequence of ML models (e.g., a sequence of optimized classifiers such as a sequence of lightweight classifiers) and the Shapley ensemble boosting framework 100 can train the sequence of ML models (e.g., the sequence of optimized classifiers). Additionally, the Shapley ensemble boosting framework 100 can aggregate results from the sequence of ML models as output (e.g., the ensemble prediction 110). Accordingly, to improve efficiency of the Shapley ensemble boosting framework 100, the Shapley ensemble boosting framework 100 can be configured to minimize a training cost for each ML model of the sequence of ML models. To address this, the data sampling 102 can be performed before the model training 104 at each iteration of the Shapley ensemble boosting framework 100. Accordingly to various embodiments, the data sampling 102 can be performed based on benchmarks and features. For example, at each iteration, a subset of benchmarks and features can be fed into a respective ML model of the sequence of ML models. In various embodiments, the data sampling 102 can collect data from benchmarks via Trust-Hub and/or ISCAS-89.

In various embodiments, the subset of features 105 can be features for hardware trojan detection. The subset of features 105 can include, but is not limited to, features related to logic-gates, a number of inputs of a logic gate (e.g., fan_ins logic gates), flip flops, networks, cells, multiplexers, constants, switches, dynamic power, loops in netlists related to a description of connections for a circuit sample, parallel in/parallel out (PI/PO) shift registers, and/or other information related to a circuit. For example, in case of combinational circuit triggers, a number of inputs of a logic gate tends to become large for extremely rare triggers. Example features that may be included in the subset of features 105 is further illustrated and described in Table 1:

TABLE 1

| Features | Description |
|---|---|
| Nets | total number of networks. |
| Cells | total number of cells. |
| fan_in_x | number of inputs of a logic gate up to x-level away from a PI/PO. |
| in_FF_x | number of flip-flops up to x-level away from the PI. |
| out_FF_x | number of flip-flops up to x-level away from the PO. |
| in_MUX_x | number of multiplexers up to x-level away from the PI. |
| out_MUX_x | number of multiplexers up to x-level away from the PO. |
| in_loop_x | number of up to x-level loops. |
| out_loop_x | number of up to x-level loops. |
| in_const_x | number of constants up to x-level away from the PI. |
| out_const_x | number of constants up to x-level away from the PO. |
| in_pin | the level to the PI from the nearest net. |
| out_pout | the level to the PO from the nearest net. |
| {in, out}_FF | minimum level to any flip-flop from the PI/PO. |
| {in, out}_MUX | minimum level to any multiplexer from the PI/PO. |
| Rare Switches | number of total rare switches during simulation. |
| Dynamic Power | dynamic power change during simulation (mW). |

In various embodiments, once the subset of sampled data is obtained, the model training 104 can begin. In certain embodiments, each ML model of the one or more ML models 101 and/or the one or more trained ML models 107 can be configured as a decision tree. For example, a decision tree can be a supervised learning approach based on a tree structure. A decision tree can also predict a class of a target by traversing from the root to the leaf of the tree. In various embodiments, the model training 104 can compare values of node attributes with the record attribute. On the basis of the comparison, the model training 104 can analyze the branch corresponding to that value and/or can further analyze children nodes until a leaf node is reached. In various embodiments, the model training 104 can utilize a classification and regression trees (CART) technique to train one or more ML models (e.g., the one or more ML models 101 and/or the one or more trained ML models 107) and/or to generate one or more decision trees. Additionally, the model training 104 can utilize Lasso Regression (L1) regularization and/or Ridge Regression (L2) regularization to minimize the likelihood of overfitting of a ML model (e.g., the one or more ML models 101 and/or the one or more trained ML models 107). Once the model training 104 is completed, the one or more trained ML models 107 (e.g., one or more trained decision trees) can be utilized to detect hardware trojans related to one or more circuits.

Figure 1B:
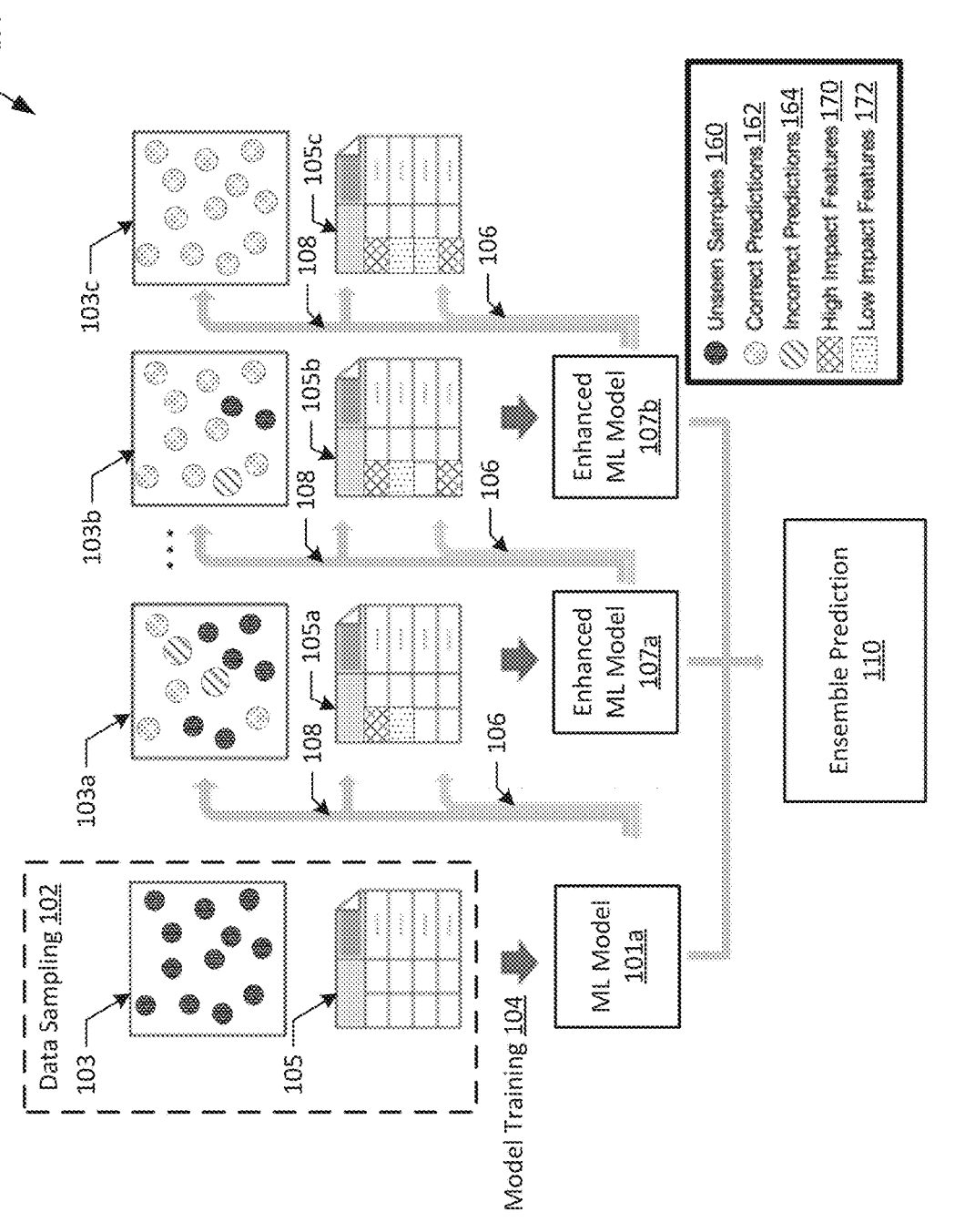
FIG. 1B provides another example Shapley ensemble boosting framework, according to one or more embodiments of the present disclosure.

FIG. 1B illustrates a Shapley ensemble boosting framework 150 for hardware trojan detection, according to one or more embodiments of the present disclosure. The Shapley ensemble boosting framework 150 can represent one or more embodiments of the Shapley ensemble boosting framework 100. The Shapley ensemble boosting framework 150 includes the data sampling 102, the model training 104, the Shapley analysis 106, and/or the weight adjustment 108 to provide the ensemble prediction 110 for hardware trojan detection.

In various embodiments, the data sampling 102 can extract the subset of features 105 from the data pool 103. In various embodiments, the data pool 103 can include data related to one or more circuit samples. The one or more circuit samples can be related to one or more circuits of a hardware IP core. For, the data pool 103 can include unseen samples 160 related to one or more circuits of a hardware IP core. The unseen samples 160 can be unseen data that is new to the one or more ML models 101 and/or is not yet a part of a training process for the one or more ML models 101. In various embodiments, the subset of features 105 can be related to hardware trojan detection features for the one or more circuit samples. For example, the subset of features 105 can include features related to logic-gates, a number of inputs of a logic gate (e.g., fan_ins logic gates), flip flops, networks, cells, multiplexers, constants, switches, dynamic power, loops in netlists related to a description of connections for a circuit sample, PI/PO shift registers, and/or one or more other features to the one or more circuits.

In various embodiments, the model training 104 can train at least one of the one or more ML models 101 based on the subset of features 105. In certain embodiments, the one or more ML models 101 can be one or more decision tree models configured for hardware trojan detection. In various embodiments, the model training 104 can train and/or generate a ML model 101a based on the subset of features 105. In various embodiments, the model training 104 can include and/or utilize the Shapley analysis 106 and/or the weight adjustment 108 to train the ML model 101a for hardware trojan detection. For example, the Shapley analysis 106 can be implemented as a local feature attribute technique that determines predictions as a summation of individual feature contributions from the subset of features 105. In various embodiments, the Shapley analysis 106 can utilize a set of Shapley values that provides a predicted contribution and/or a degree of importance of each feature of the subset of features 105 towards a hardware trojan detection prediction task. In certain embodiments, the subset of features 105 can be selected for one or more hardware trojan detection tasks based at least in part on the set of Shapley values. Additionally or alternatively, a contribution measurement related to the subset of features 105 can be generated based at least in part on the set of Shapley values to provide the ML model 101a as an explainable machine learning model for hardware trojan detection. The weight adjustment 108 can be implemented to adjust one or more weights of the ML model 101*a* for benchmarks and/or features related to hardware trojan detection. In a non-limiting example, the ML model 101*a* can be associated with a data pool 103*a* that includes unseen samples 160, correct predictions 162 for hardware trojan detection, and incorrect predictions 164 for hardware trojan detection. Additionally, the ML model 101*a* can be associated with features 105*a* that includes high impact features 170 and low impact features 172 for hardware trojan detection.

In various embodiments, the model training 104 can include and/or utilize the Shapley analysis 106 and/or the weight adjustment 108 to further improve and/or optimize the ML model 101*a* for hardware trojan detection. For example, the model training 104 can include and/or utilize the Shapley analysis 106 and/or the weight adjustment 108 to generate an enhanced ML model 107*a* for hardware trojan detection. The enhanced ML model 107*a* can be an enhanced machine learning model with respect to the ML model 101*a* for hardware trojan detection related to the one or more circuits. In various embodiments, the Shapley analysis 106 can modify the ML model 101*a* based at least in part on a set of Shapley values to generate the enhanced ML model 107*a*. In certain embodiments, features 105*b* related to the enhanced ML model 107*a* can be selected for one or more hardware trojan detection tasks based at least in part on the set of Shapley values. Additionally or alternatively, a contribution measurement related to the features 105*b* can be generated based at least in part on the set of Shapley values to provide the enhanced ML model 107*a* as an explainable machine learning model for hardware trojan detection. Additionally or alternatively, the weight adjustment 108 can adjust one or more weights for the ML model 101*a* based on a probability of features for a next iteration of training with respect to the ML model 101*a*. Additionally or alternatively, the weight adjustment 108 can adjust one or more weights for the ML model 101*a* based on a probability of benchmarks for a next iteration of training with respect to the ML model 101*a*. In a non-limiting example, the enhanced ML model 107*a* can be associated with a data pool 103*b* that includes unseen samples 160, correct predictions 162 for hardware trojan detection, and a single incorrect prediction 164 for hardware trojan detection. Additionally, the enhanced ML model 107*a* can be associated with features 105*b* that includes multiple high impact features 170 and low impact features 172 for hardware trojan detection.

In various embodiments, the model training 104 can include and/or utilize the Shapley analysis 106 and/or the weight adjustment 108 to further improve and/or optimize the enhanced ML model 107*a* for hardware trojan detection. For example, the model training 104 can include and/or utilize the Shapley analysis 106 and/or the weight adjustment 108 to generate an enhanced ML model 107*b* for hardware trojan detection. The enhanced ML model 107*b* can be an enhanced machine learning model with respect to the enhanced ML model 107*a* and/or the ML model 101*a* for hardware trojan detection related to the one or more circuits. In various embodiments, the Shapley analysis 106 can modify the enhanced ML model 107*a* based at least in part on a set of Shapley values to generate the enhanced ML model 107*b*. In certain embodiments, features 105*c* related to the enhanced ML model 107*b* can be selected for one or more hardware trojan detection tasks based at least in part on the set of Shapley values. Additionally or alternatively, a contribution measurement related to the features 105*c* can be generated based at least in part on the set of Shapley values to provide the enhanced ML model 107*b* as an explainable machine learning model for hardware trojan detection. Additionally or alternatively, the weight adjustment 108 can adjust one or more weights for the enhanced ML model 107*a* based on a probability of features for a next iteration of training with respect to the enhanced ML model 107*a*. Additionally or alternatively, the weight adjustment 108 can adjust one or more weights for the enhanced ML model 107*a* based on a probability of benchmarks for a next iteration of training with respect to the enhanced ML model 107*a*. In a non-limiting example, the enhanced ML model 107*b* can be associated with a data pool 103*c* that includes correct predictions 162 for hardware trojan detection (e.g., without unseen samples and/or incorrect predictions for hardware trojan detection). Additionally, the enhanced ML model 107*b* can be associated with features 105*c* that includes multiple high impact features 170 and multiple low impact features 172 for hardware trojan detection.

In certain embodiments, the ML model 101*a*, the enhanced ML model 107*a*, and/or the enhanced ML model 107*b* can be configured as a set of ensemble models where one or more features that satisfy defined criteria for the Shapley analysis 106 are identified in a previous ensemble model from the set of ensemble models. Additionally or alternatively, one or more weights in a next ensemble model from the set of ensemble models can be adjusted via the weight adjustment 108 based at least in part on the one or more features to mitigate a potential misprediction of the previous ensemble model. Accordingly, improved hardware trojan detection related to the one or more circuits can be provided.

In various embodiments, the ML model 101*a*, the enhanced ML model 107*a*, and/or the enhanced ML model 107*b* can be deployed for the hardware trojan detection related to the one or more circuits. For example, the ML model 101*a*, the enhanced ML model 107*a*, and/or the enhanced ML model 107*b* can be utilized to provide the ensemble prediction 110. In certain embodiments, the ML model 101*a*, the enhanced ML model 107*a*, and/or the enhanced ML model 107*b* can be applied to a new set of features for a new data pool related to one or more circuits to provide the ensemble prediction 110 for the one or more circuits. In various embodiments, the ML model 101*a*, the enhanced ML model 107*a*, and/or the enhanced ML model 107*b* can be executed in parallel to reduce an amount of time for the hardware trojan detection. In various embodiments, the enhanced ML model 107*a* and/or the enhanced ML model 107*b* can correspond to multiple optimized (e.g., lightweight) machine learning models associated with ensemble boosting as compared to the ML model 101*a*. Additionally, the enhanced ML model 107*a* and/or the enhanced ML model 107*b* corresponding to the multiple optimized machine learning models can be configured for execution in parallel to reduce an amount of time for the hardware trojan detection.

Figure 2:
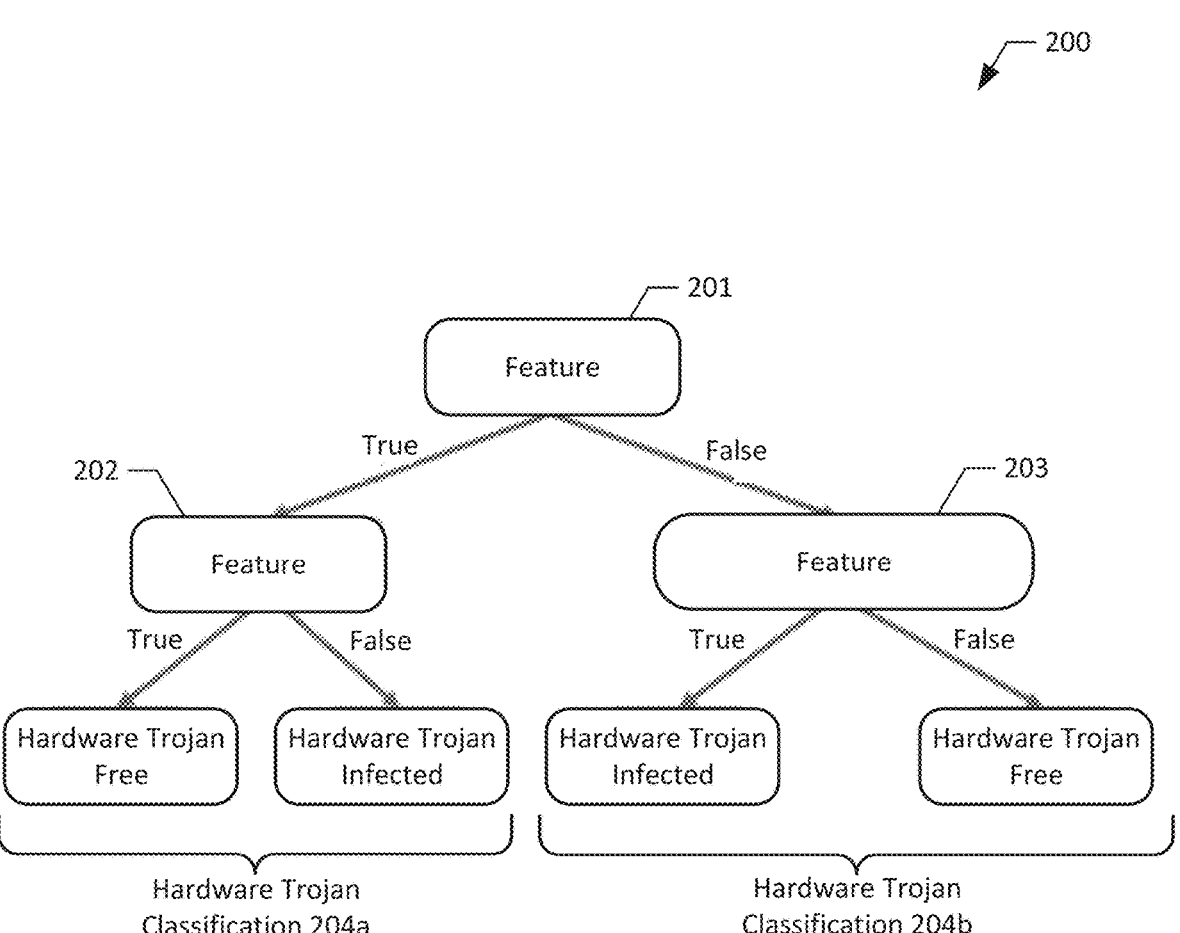
FIG. 2 illustrates an example decision tree model, according to one or more embodiments of the present disclosure.

FIG. 2 illustrates an example decision tree model 200 that provides one or more hardware trojan classifications 204 using a feature 201 (e.g., a first feature), a feature 202 (e.g., a second feature), and a feature 203 (e.g., a third feature). For example, the feature 201 can be related to a number of flip-flops in a circuit sample, the feature 202 can be related to a number of cells in the circuit sample, and the feature 203 can be related to a number of rare switches in the circuit sample. In a non-limiting example, the feature 201 can be related to a determination as to whether a number of flip-flops in a circuit sample is greater than a defined threshold value (e.g., whether a number of flip-flops in a circuit sample is greater than 50, etc.). In another non-limiting example, the feature 202 can be related to a determination as to whether a number of cells in the circuit sample is greater than a defined threshold value (e.g., whether a number of cells in the circuit sample is greater than 2000). In yet another non-limiting example, the feature 203 can be related to a determination as to whether a number of rare switches in the circuit sample is greater than a defined threshold value (e.g., whether a number of rare switches in the circuit sample is greater than 200). In various embodiments, in result to a positive (e.g., true) result of the feature 201, the feature 202 can be determined. Additionally, in result to a negative (e.g., false) result of the feature 201, the feature 203 can be determined.

The hardware trojan classifications 204 can be an ensemble prediction (e.g., the ensemble prediction 110) related to hardware trojan detection. For example, the hardware trojan classifications 204 can predict whether or not the circuit sample is associated with a hardware trojan (e.g., whether the circuit sample is hardware trojan free or hardware trojan infected). In certain embodiments, a combination of the feature 201 and the feature 202 can result in a first hardware trojan classification 204*a*. Additionally, a combination of the feature 201 and the feature 203 can result in a second hardware trojan classification 204*b*. In an example, in result to a positive (e.g., true) result of the feature 202, the first hardware trojan classification 204*a* can correspond to a hardware trojan free prediction for the circuit sample. However, in result to a negative (e.g., false) result of the feature 202, the first hardware trojan classification 204*a* can correspond to a hardware trojan infected prediction for the circuit sample. In another example, in result to a positive (e.g., true) result of the feature 203, the second hardware trojan classification 204*b* can correspond to hardware trojan infected prediction for the circuit sample. However, in result to a negative (e.g., false) result of the feature 203, the second hardware trojan classification 204*b* can correspond to a hardware trojan free prediction for the circuit sample.

In various embodiments, the Shapley analysis 106 can be applied to one or more ML tasks. Additionally, in various embodiments, the Shapley analysis 106 can utilize a local feature attribution technique to describe every prediction from a ML model as a summation of each individual feature contributions. For example, assume a decision tree model is built with three different features (e.g., feature 201, feature 202 and feature 203) for hardware trojan detection as illustrated in FIG. 2. To compute Shapley analysis values, the Shapley analysis 106 can begin with a null model without any independent features. Additionally, the Shapley analysis 106 can compute payoff gain as each feature is added to the decision tree model in a sequence. In addition, the Shapley analysis 106 can compute an average over all possible sequences. In this example, since the three different features (e.g., feature 201, feature 202 and feature 203) of the decision tree model corresponds to three independent variables, a computation process for a Shapley analysis value of the first feature is presented below in Table 2:

TABLE 2

| Sequences | Marginal Contributions |
| --- | --- |
| 1, 2, 3 | $\pounds(\{1\}) - \pounds(0)$ |
| 1, 3, 2 | $\pounds(\{1\}) - \pounds(0)$ |
| 2, 1, 3 | $\pounds(\{1, 2\}) - \pounds(\{2\})$ |

TABLE 2-continued

| Sequences | Marginal Contributions |
| --- | --- |
| 2, 3, 1 | $\pounds(\{1, 2, 3\}) - \pounds(\{2, 3\})$ |
| 3, 1, 2 | $\pounds(\{1, 3\}) - \pounds(\{3\})$ |
| 3, 2, 1 | $\pounds(\{1, 2, 3\}) - \pounds(\{3, 2\})$ |

Here, $\pounds$ is the loss function. The loss function serves as the score function to indicate a degree of payoff by applying existing features. For example, in the first row, the sequence is 1, 2, 3, meaning the first, second, and the third features can be sequentially added into consideration for a classification. For example, 0 corresponds to a model without considering any features (e.g., a random guess classifier) and $\pounds(0)$ can be the corresponding loss. Additionally, by adding the first feature into the scenario, $\{1\}$ can represent a dummy model that only uses this feature to perform prediction. The loss $\pounds(\{1\})$ can then be computed and $\pounds(\{1\})-\pounds(0)$ can be the marginal contribution of the first feature for this specific sequence. Accordingly, the Shapley analysis 106 can determine the Shapley analysis values of the first feature by computing the marginal contributions of all six sequences and taking the average of the six sequences. The Shapley analysis 106 can perform similar computations for the other features (e.g., second and third features). In various embodiments, a Shapley analysis value can indicate impact towards model decisions.

In various embodiments, the weight adjustment 108 can tune probabilities of selecting benchmarks and/or features during respective iterations of the model training 104. In certain embodiments for incorrectly predicted benchmarks, the weight adjustment 108 can increase the weights. Additionally or alternatively, in certain embodiments for high-impact features from incorrectly predicted benchmarks, the weight adjustment 108 can decrease the weights. Additionally or alternatively, in certain embodiments for high-impact features from correctly predicted benchmarks, the weight adjustment 108 can increase the weights. In various embodiments, the weight adjustment 108 can normalize the weight values at the start of each iteration of the model training 104.

For weight adjustment for benchmarks, the weight adjustment 108 can adjust benchmark weights to maximize sampling of certain samples in a next iteration. For example, to accelerate the convergence speed, the weight adjustment 108 can prioritize benchmarks with a larger prediction error. Therefore, for a misclassified benchmark $X_i$, we should _____ the weight adjustment 108 result in $$\Delta w_i^b \propto \mathcal{L}(y_i, \hat{y}_i)$$

where $\pounds$ is the loss function measuring the extent of prediction error. For a binary classification task related to the weight adjustment 108, $\pounds$ can be selected as the cross-entropy, $$\mathcal{L}(y_i, \hat{y}_i) \triangleq (y_i \log \hat{y}_i + (1 - y_i)\log(1 - \hat{y}_i)),$$

which can lead to:

$$\Delta w_i^b \propto (y_i \log \hat{y}_i + (1 - y_i)\log(1 - \hat{y}_i)) \Rightarrow w_{i_{(t+1)}}^b =$$
$$w_{i_{(t)}}^b + \alpha(y_i \log \hat{y}_i + (1 - y_i)\log(1 - \hat{y}_i)) \text{ or } w_{i_{(t+1)}}^b =$$
$$w_{i_{(t)}}^b + \alpha(y_i \log \hat{y}_i + (1 - y_i)\log(1 - \hat{y}_i))$$

where t represents for the t-th iteration, and α can be a hyperparameter which affects the learning rate. In various embodiments, the weight adjustment 108 can artificially limit the step size to be small such that the parameters are more likely to converge to the optimal values, thereby providing better overall performance for the ML model. With respect to hardware trojan detection with Shapley ensemble boosting as disclosed herein, Xi∈D can be denoted as the i-th benchmark from the entire dataset D. Additionally the corresponding label for Xi can be denoted as $y_i$, where $y_i$=0 represents for a hardware trojan-free benchmark and $y_i$=1 for a hardware trojan-infected benchmark. A prediction probability provided by a ML model for the benchmark can be denoted as $y_i$. Additionally, the weight of $X_i$ can correspond to $w^b{}_i$. As for features, $F_j$∈F can be denoted as the j-th feature from the candidate feature list (e.g., as illustrated in Table 1). The weight of $F_j$ can be represented by $w^f{}_i$. Moreover, $F_{ij}$ can represent the value of Fi for the specific instance $X_i$.

For weight adjustment for features, the weight adjustment 108 can measure the extent of adjustment by the contribution of the feature towards the ML model output. For example, the greater the contribution, the larger the extent of adjustment can be provided via the weight adjustment 108. In various embodiments, the weight adjustment 108 can utilize correctness for weight adjustment of features. For example, in certain embodiments for case of high-impact features from incorrectly predicted benchmarks, the weight adjustment 108 can decrease the weights. Additionally, for each feature, contribution can vary from benchmark to benchmark. Therefore, a computation for weight adjustment for features by the weight adjustment 108 can be an overall summation among all tested samples. In various embodiments, the contribution can be measured by SHAP. For example, SHAP($F_{ij}$) can denote the SHAP value of $F_{ij}$. Accordingly, $$\Delta w_j^f \propto \sum \left( \pm w_i^b \mathcal{L}(y_i, \hat{y}_i) SHAP(F_{ij}) \right)$$

where ± is positive for correct prediction and vice versa. Additionally, $\Delta w^f{}_i$ can be a weighted summation to take into consideration weights of the benchmarks. Corresponding features of large benchmark weights can be emphasized more than other features. Therefore, $$w_{j_{(t+1)}}^f = w_{j_{(t)}}^f + \beta \sum \left( \pm w_{i_{(t+1)}}^b \mathcal{L}(y_i, \hat{y}_i) SHAP(F_{ij}) \right)$$

where t represents the t-th iteration, and ß is another hyperparameter. In various embodiments, the weight adjustment 108 can utilize the same criteria for tuning ß as that for α. Accordingly, the weight adjustment 108 can utilize the two procedures to adjust and/or normalize the weight values for respective training iterations. Additionally, the model training 104 and/or the weight adjustment 108 can be repeated until convergence is reached.

In various embodiments, the ensemble prediction 110 can provide a prediction from respective ML models for hardware trojan detection. In various embodiments, the ensemble prediction 110 can be an average of the output from all predictions from each ML model (e.g., from each decision tree).

FIG. 3 illustrates an algorithm 300 that provides for Shapley ensemble boosting for hardware trojan detection according to one or more embodiments of the present disclosure. In various embodiments, the algorithm 300 can be employed by the Shapley ensemble boosting framework 100 to provide the ensemble prediction 110. For example, the algorithm 300 can be associated with the data sampling 102, the model training 104, the Shapley analysis 106, and the weight adjustment 108. In various embodiments, input to the data sampling 102 can include benchmark dataset D (e.g., the data pool 103) and a feature set F (e.g., the subset of features 105). Additionally, input to the model training 104 can include instance s related to an instance of training, learning rate a and/or ß related to a learning rate for the training, and/or epochs k. In various embodiments, output can include an ensemble model T (e.g., ML model 101a, enhanced ML model 107a, or enhanced ML model 107b) and/or prediction res (e.g., ensemble prediction 110).

FIG. 4 illustrates an example ensemble boosting system 400 for improving accuracy and efficiency of machine learning models, according to one or more embodiments of the present disclosure. For example, the ensemble boosting system 400 can be related to the Shapley ensemble boosting framework 100. The ensemble boosting system 400 illustrated in FIG. 4 includes of a set of ML models 1-N where N is an integer and subsequent machine learning models focus on addressing weaknesses of one or more previous machine learning models. In various embodiments, the set of ML models 1-N can be a set of machine learning models integrated into the Shapley ensemble boosting framework 100. In various embodiments, the set of ML models 1-N can be a set of machine learning models that are trained via the model training 104. For example, the set of ML models 1-N can correspond to one or more ML from the one or more ML models 101 and/or the one or more enhanced ML models 107. In an example, the set of ML models 1-N can correspond to the ML model 101a, the enhanced ML model 107a, and the enhanced ML model 107b.

The final classifications, decisions, and/or predictions provided by the set of ML models 1-N can be based on an overall result generated based on each output of the respective machine learning models 1-N. In various embodiments, ensemble boosting can be used to refine and improve the accuracy and efficiency of the set of ML models 1-N. For instance, previous iterations of a particular machine learning model from the set of ML models 1-N can be ensembled together to refine a current iteration of the machine learning model. Additionally, in various embodiments, previous iterations of the machine learning model can be run in parallel to increase the speed in which a classification, decision, and/or prediction can be generated. In various embodiments, the set of ML models 1-N can provide ensembled output 402. In various embodiments, the ensembled output 402 can correspond to the ensemble prediction 110.

FIG. 5 illustrates a flowchart of a method 500 for providing Shapley ensemble boosting for hardware trojan detection related to circuits according to one or more embodiments of the present disclosure. According to the illustrated embodiment, the method 500 includes a step 502 for extracting a plurality of features related to hardware trojan detection from one or more circuit samples related to one or more circuits. Additionally, the method 500 includes a step 504 for training one or more machine learning models based at least in part on the plurality of features. In certain embodiments, the one or more machine learning models are one or more decision tree models. The method 500 additionally includes a step 506 for modifying the one or more machine learning models based at least in part on a set of Shapley values and/or one or more weight adjustments to generate one or more enhanced machine learning models for hardware trojan detection related to the one or more circuits. The method 500 additionally includes a step 508 for deploying the one or more enhanced machine learning models for the hardware trojan detection related to the one or more circuits.

In certain embodiments, the one or more enhanced machine learning models comprise multiple optimized (e.g., lightweight) machine learning models associated with ensemble boosting and/or optimized weighting as compared to the one or more machine learning models. Additionally or alternatively, the multiple optimized machine learning models are configured for execution in parallel to reduce an amount of time for the hardware trojan detection.

In certain embodiments, the one or more machine learning models and/or the one or more enhanced machine learning models are configured as a set of ensemble models. In certain embodiments, the method 500 additionally or alternatively includes identifying one or more features in a previous ensemble model from the set of ensemble models that satisfy defined criteria for Shapley value analysis. In certain embodiments, the method 500 additionally or alternatively includes adjusting one or more weights in a next ensemble model from the set of ensemble models based at least in part on the one or more features to mitigate a potential misprediction of the previous ensemble model.

In certain embodiments, the method 500 additionally or alternatively includes adjusting one or more weights for the one or more enhanced machine learning models based at least in part on a probability of features for a next iteration of training with respect to the one or more enhanced machine learning models. In certain embodiments, the method 500 additionally or alternatively includes adjusting one or more weights for the one or more enhanced machine learning models based at least in part on a probability of benchmarks for a next iteration of training with respect to the one or more enhanced machine learning models. In certain embodiments, the method 500 additionally or alternatively includes selecting one or more features for one or more hardware trojan detection tasks based at least in part on the set of Shapley values. In certain embodiments, the method 500 additionally or alternatively includes generating a contribution measurement related to a machine learning model based at least in part on the set of Shapley values to provide at least one explainable machine learning model for hardware trojan detection.

In an example embodiment, an apparatus for performing the method 500 of FIG. 5 above may include a processor configured to perform some or each of the steps (502, 504, 506, and/or 508) described above. The processor may, for example, be configured to perform the steps (502, 504, 506, and/or 508) by performing hardware implemented logical functions, executing stored instructions, or executing algorithms for performing each of the operations. Alternatively, the apparatus may comprise means for performing each of the operations described above. In this regard, according to an example embodiment, examples of means for performing steps 502, 504, 506, and/or 508 may comprise, for example, the processor and/or a device or circuit for executing instructions, executing operations, or executing an algorithm for processing information as described above. In various embodiments, an apparatus for performing the method 500 may correspond to apparatus 600 illustrated in FIG. 6.

B. Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Figure 6:
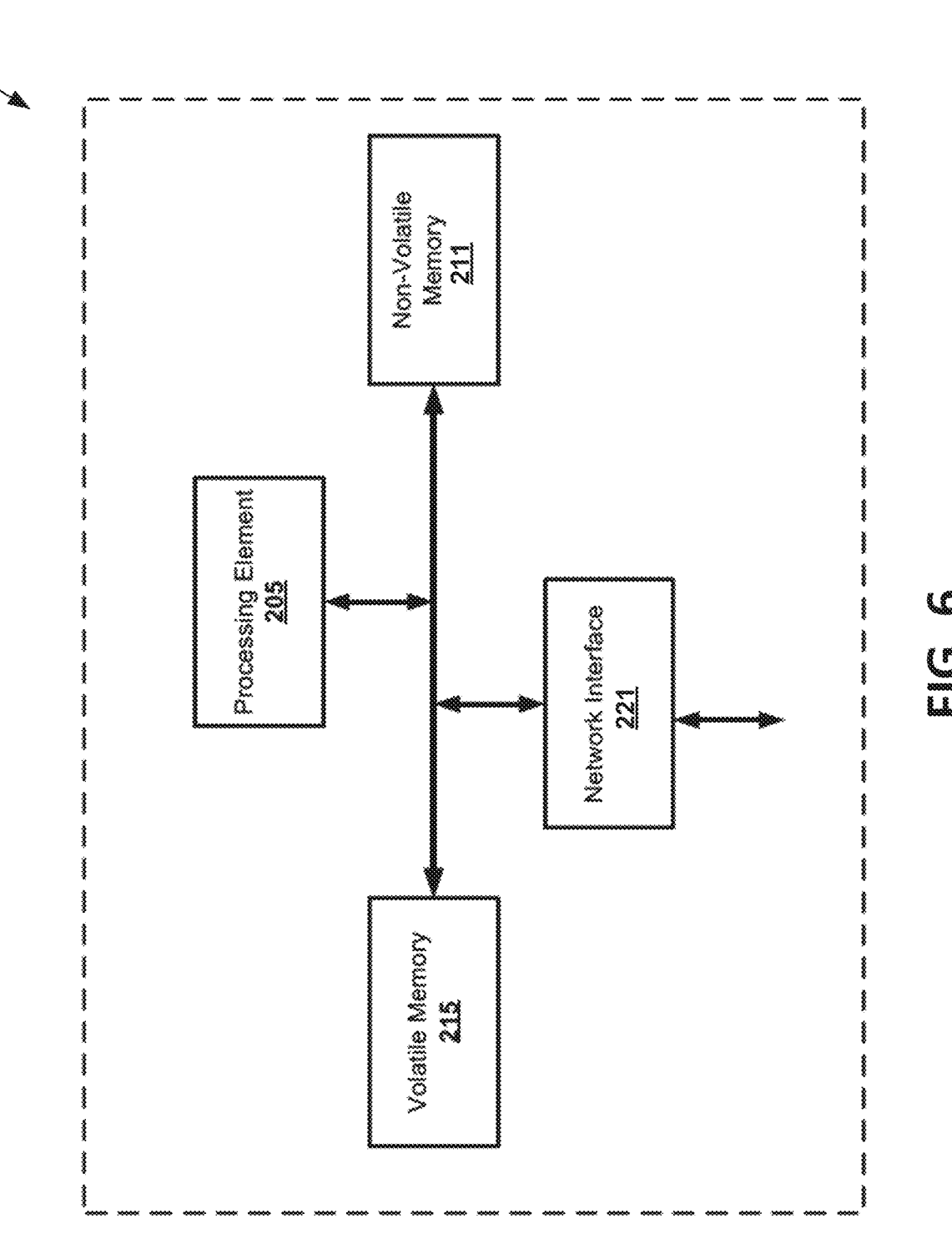
FIG. 6 illustrates a schematic of a computing entity that may be used in conjunction with one or more embodiments of the present disclosure.

FIG. 6 provides a schematic of an exemplary apparatus 600 that may be used in accordance with various embodiments of the present disclosure. In particular, the apparatus 600 may be configured to perform various example operations described herein to provides for Shapley ensemble boosting for hardware trojan detection. In some example embodiments, the apparatus 600 may be embodied by the Shapley ensemble boosting framework 100. For example, the apparatus 600 may be configured to execute the data sampling 102, the model training 104, the Shapley analysis 106, and/or the weight adjustment 108. Additionally or alternatively, the apparatus 600 may be configured to execute the one or more ML models 101 and/or the one or more enhanced ML models 107 to provide the ensemble prediction 110.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the apparatus 600 shown in FIG. 6 may be embodied as a plurality of computing entities, tools, and/or the like operating collectively to perform one or more processes, methods, and/or steps. As just one non-limiting example, the apparatus 600 may comprise a plurality of individual data tools, each of which may perform specified tasks and/or processes.

Depending on the embodiment, the apparatus 600 may include one or more network and/or communications interfaces 221 for communicating with various computing entities, such as by communicating data, content, information, and/or similar terms used herein interchangeably that can be transmitted, received, operated on, processed, displayed, stored, and/or the like. Thus, in certain embodiments, the apparatus 600 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the apparatus 600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), 5G New Radio (5G NR), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibrec, Bluetooth protocols, wireless universal serial bus (USB) protocols, and/or any other wireless protocol. The apparatus 600 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the apparatus 600 includes or is in communication with one or more processing elements 205 (also referred to as processors, processing circuitry, and/or similar terms used herein interchangeably) that communicate with other elements within the apparatus 600 via a bus, for example, or network connection. As will be understood, the processing element 205 may be embodied in several different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware, computer program products, or a combination thereof, the processing element 205 may be capable of performing steps or operations according to embodiments of the present disclosure when configured accordingly.

In various embodiments, the apparatus 600 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 211 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 211 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense refer to a structured or unstructured collection of information/data that is stored in a computer-readable storage medium.

In particular embodiments, the non-volatile memory media 211 may also be embodied as a data storage device or devices, as a separate database server or servers, or as a combination of data storage devices and separate database servers. Further, in some embodiments, the non-volatile memory media 211 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the apparatus 600 may further include or be in communication with volatile media (also referred to as volatile storage, memory, memory storage, memory circuitry and/or similar terms used herein interchangeably). For instance, the volatile storage or memory may also include one or more volatile storage or volatile memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 205. Thus, the databases, database instances, database management system entities, data, images, applications, programs, program modules, scripts, source code, object code, byte code, compiled code, interpreted code, machine code, executable instructions, and/or the like may be used to control certain aspects of the operation of the apparatus 600 with the assistance of the processing element 205 and operating system.

As will be appreciated, one or more of the computing entity's components may be located remotely from the other computing entity components, such as in a distributed system. Furthermore, one or more of the components may be aggregated, and additional components performing functions described herein may be included in the apparatus 600. Thus, the apparatus 600 can be adapted to accommodate a variety of needs and circumstances.

C. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing Shapley ensemble boosting for hardware trojan detection related to circuits, the method comprising:

extracting, by one or more processors, a plurality of features related to hardware trojan detection from one or more circuit samples related to one or more circuits;

training, by the one or more processors, one or more machine learning models based at least in part on the plurality of features;

modifying, by the one or more processors, the one or more machine learning models based at least in part on a set of Shapley values to generate one or more enhanced machine learning models for the hardware trojan detection related to the one or more circuits, comprising adjusting one or more weights for the one or more enhanced machine learning models based at least in part on a prediction probability for a next iteration of training with respect to the one or more enhanced machine learning models; and deploying, by the one or more processors, the one or more enhanced machine learning models for the hardware trojan detection related to the one or more circuits.

2. The method of claim 1, further comprising:

adjusting one or more weights for the one or more enhanced machine learning models based at least in part on a probability of features for a next iteration of training with respect to the one or more enhanced machine learning models.

3. The method of claim 1, further comprising:

adjusting one or more weights for the one or more enhanced machine learning models based at least in part on a probability of benchmarks for a next iteration of training with respect to the one or more enhanced machine learning models.

4. The method of claim 1, wherein the one or more machine learning models are one or more decision tree models.

5. The method of claim 1, further comprising:

selecting one or more features for one or more hardware trojan detection tasks based at least in part on the set of Shapley values.

6. The method of claim 1, further comprising:

generating a contribution measurement related to a machine learning model based at least in part on the set of Shapley values to provide at least one explainable machine learning model for hardware trojan detection.

7. The method of claim 1, wherein the one or more enhanced machine learning models comprise multiple optimized machine learning models associated with ensemble boosting as compared to the one or more machine learning models.

8. The method of claim 7, wherein the multiple optimized machine learning models are configured for execution in parallel to reduce an amount of time for the hardware trojan detection.

9. The method of claim 1, wherein the one or more machine learning models are configured as a set of ensemble models, and the method further comprising:

identifying one or more features in a previous ensemble model from the set of ensemble models that satisfy defined criteria for Shapley value analysis; and adjusting one or more weights in a next ensemble model from the set of ensemble models based at least in part on the one or more features to mitigate a potential misprediction of the previous ensemble model.

10. An apparatus comprising at least one processor and at least one memory including program code, the at least one memory and the program code configured to, with the at least one processor, cause the apparatus to at least:

extract a plurality of features related to hardware trojan detection from one or more circuit samples related to one or more circuits;

train one or more machine learning models based at least in part on the plurality of features;

modify the one or more machine learning models based at least in part on a set of Shapley values to generate one or more enhanced machine learning models for the hardware trojan detection related to the one or more circuits, wherein one or more weights for the one or more enhanced machine learning models are adjusted based at least in part on a prediction probability for a next iteration of training with respect to the one or more enhanced machine learning models; and deploy the one or more enhanced machine learning models for the hardware trojan detection related to the one or more circuits.

11. The apparatus of claim 10, wherein the at least one memory and the program code are configured to, with the at least one processor, further cause the apparatus to at least:

adjust one or more weights for the one or more enhanced machine learning models based at least in part on a probability of features for a next iteration of training with respect to the one or more enhanced machine learning models.

12. The apparatus of claim 10, wherein the at least one memory and the program code are configured to, with the at least one processor, further cause the apparatus to at least:

adjust one or more weights for the one or more enhanced machine learning models based at least in part on a probability of benchmarks for a next iteration of training with respect to the one or more enhanced machine learning models.

13. The apparatus of claim 10, wherein the one or more machine learning models are one or more decision tree models.

14. The apparatus of claim 10, wherein the at least one memory and the program code are configured to, with the at least one processor, further cause the apparatus to at least:

select one or more features for one or more hardware trojan detection tasks based at least in part on the set of Shapley values.

15. The apparatus of claim 10, wherein the at least one memory and the program code are configured to, with the at least one processor, further cause the apparatus to at least:

generate a contribution measurement related to a machine learning model based at least in part on the set of Shapley values to provide at least one explainable machine learning model for hardware trojan detection.

16. The apparatus of claim 10, wherein the one or more enhanced machine learning models comprise multiple optimized machine learning models associated with ensemble boosting as compared to the one or more machine learning models, and wherein the multiple optimized machine learning models are configured for execution in parallel to reduce an amount of time for the hardware trojan detection.

17. The apparatus of claim 10, wherein the one or more machine learning models are configured as a set of ensemble models, and wherein the at least one memory and the program code are configured to, with the at least one processor, further cause the apparatus to at least:

identify one or more features in a previous ensemble model from the set of ensemble models that satisfy defined criteria for Shapley value analysis; and adjust one or more weights in a next ensemble model from the set of ensemble models based at least in part on the one or more features to mitigate a potential misprediction of the previous ensemble model.

18. A non-transitory computer storage medium comprising instructions, the instructions being configured to cause one or more processors to at least perform operations configured to:

extract a plurality of features related to hardware trojan detection from one or more circuit samples related to one or more circuits;

train one or more machine learning models based at least in part on the plurality of features;

modify the one or more machine learning models based at least in part on a set of Shapley values to generate one or more enhanced machine learning models for the hardware trojan detection related to the one or more circuits, wherein one or more weights for the one or more enhanced machine learning models are adjusted based at least in part on a prediction probability for a next iteration of training with respect to the one or more enhanced machine learning models; and deploy the one or more enhanced machine learning models for the hardware trojan detection related to the one or more circuits.

19. The non-transitory computer storage medium of claim 18, wherein the operations are further configured to:

adjust one or more weights for the one or more enhanced machine learning models based at least in part on a probability of features for a next iteration of training with respect to the one or more enhanced machine learning models.

20. The non-transitory computer storage medium of claim 18, wherein the operations are further configured to:

adjust one or more weights for the one or more enhanced machine learning models based at least in part on a probability of benchmarks for a next iteration of training with respect to the one or more enhanced machine learning models.

* * * * *